(No Model.) 2 Sheets—Sheet 1.

A. C. HAFELY & J. REDLEFSEN.
MANUFACTURE OF CELLULOID BOXES.

No. 505,462. Patented Sept. 26, 1893.

WITNESSES:

INVENTORS,
A. C. Hafely
and Jens Redlefsen
BY
ATTORNEY.

(No Model.) 2 Sheets—Sheet 2.

A. C. HAFELY & J. REDLEFSEN.
MANUFACTURE OF CELLULOID BOXES.

No. 505,462. Patented Sept. 26, 1893.

UNITED STATES PATENT OFFICE.

ALFRED C. HAFELY, OF NEW YORK, AND JENS REDLEFSEN, OF BROOKLYN, NEW YORK.

MANUFACTURE OF CELLULOID BOXES.

SPECIFICATION forming part of Letters Patent No. 505,462, dated September 26, 1893.

Application filed November 26, 1892. Serial No. 453,276. (No specimens.)

*To all whom it may concern:*

Be it known that we, ALFRED C. HAFELY, of New York city, and JENS REDLEFSEN, of Brooklyn, New York, have invented certain new and useful Improvements in the Manufacture of Celluloid-Covered Boxes and Similar Articles, of which the following is a description, reference being had to the accompanying drawings, which form a part of this specification.

Our invention relates particularly to celluloid-covered moldings for the sides of boxes; though generically it will be seen to include many other articles covered with celluloid.
Its object is to cheapen, improve, and simplify the construction of such articles; which we accomplish by the method of procedure, and the product thereof, combined and used substantially as hereinafter described, illustrated, and claimed.

Figure 1:
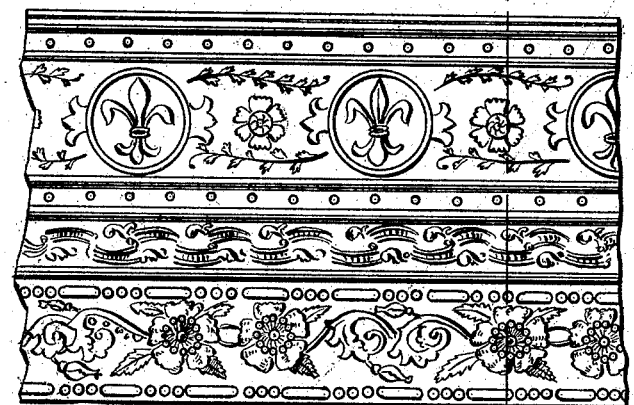
Figure 2:
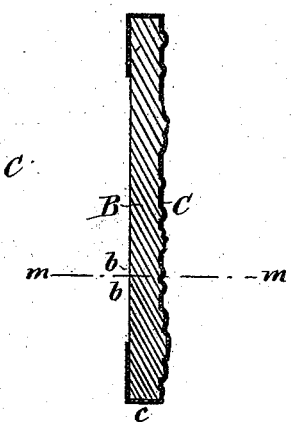
Figure 3:
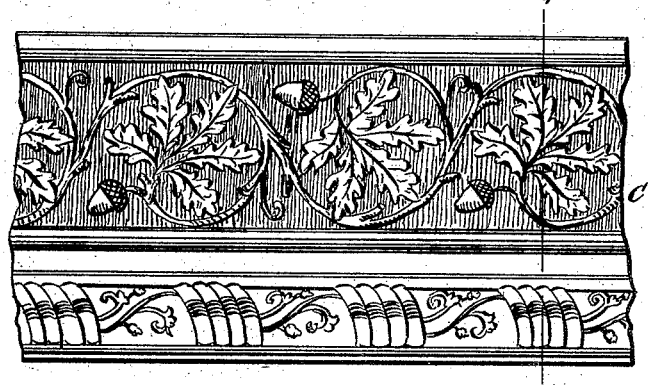
Figure 4:
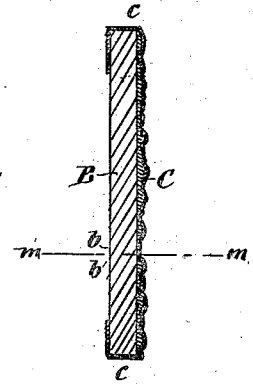
Figure 5:
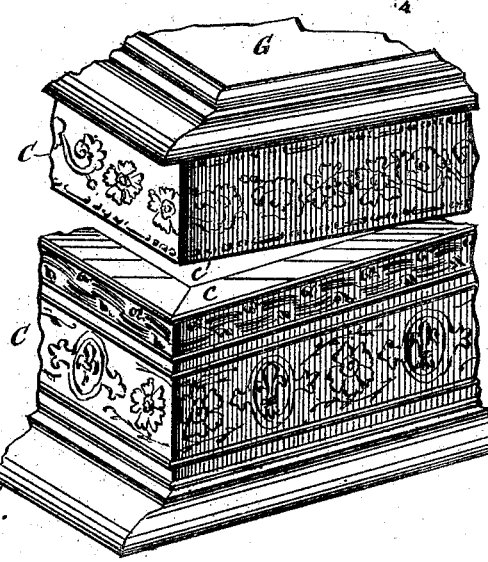
Figure 6:
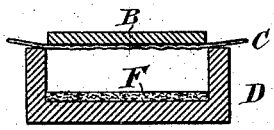
Figure 7:
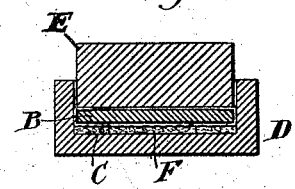
Figure 8:
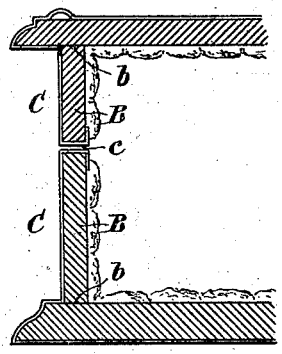

In the accompanying drawings Figures 1 and 2 are face and sectional views of molding made in accordance with our method. Figs. 3 and 4, are like views of a slightly modified construction. Fig. 5 shows our way of utilizing such molding in the manufacture of boxes. Figs. 6, 7, and 8, are views showing the successive steps in the manufacture of a box, and simple apparatus therefor.
In all the figures like letters of reference indicate like parts.

Figs. 1 and 2 show the molding for the sides of a box; Fig. 5, the finished box; and Figs. 6, 7, and 8, the apparatus for and stages of its manufacture, in accordance with the simplest form of our method. In this instance we employ sheet celluloid already embossed and preferably lined on the rear face with paper, muslin, or other fabric for the more ready adhesion of the glue or other cement by which we secure it to the wooden backing. After embossing, the celluloid veneer or facing C is coated with glue or cement. It is then laid, face down, across a heated die D, conforming to the wooden backing as shown. The strip of backing is then placed upon the celluloid as in Fig. 6 and forced into the heated die, turning up the edges of the celluloid and cementing it firmly to the face and edges of the backing. The next step is to turn down the projecting edges of the celluloid, by any suitable hand instrument, onto the back of the wooden strip B, and then to apply pressure from a follower or platen E by placing the whole apparatus (in the position shown in Fig. 7) within a press. Felting or other soft cushion F is placed within the die in order to prevent the obliteration and injury of the embossing. This method of preparing the molding is modified by using plain celluloid and employing a heated embossing die or matrix in place of the felted die just described. In this case the wooden backing also receives the impression, beneath the celluloid, corresponding with the embossing of the celluloid veneer, and for this purpose suitably selected soft wood should be employed.

Figs. 3 and 4 show the celluloid with the paper facing and Figs. 1 and 2 show it without. With the latter it is necessary to use a celluloid solvent as a cement. When the molding is finished it is cut, mitered, and secured together to form a rectangular frame corresponding with the sides of the desired box. The frame so formed is then cut in a plane corresponding to the lines $m$—$m$ of Figs. 2 and 4. Two rectangular frames are thereby produced each having one edge faced with celluloid, as at $c$ in the figures, and one edge exposing the severed edge of the wood as at $b$ in the figures. One of the frames is employed as the side of the cover of the box and glued by its wooden edge $b$ to the wooden face of the box cover or top G. The manufacture of the box tops forms the subject of Patent No. 488,630, issued to A. C. Hafely, December 27, 1892. The top is veneered with celluloid to correspond with the sides, and the veneer extends beneath the lower face of the box top and meets the veneer C but leaves the wood, beyond, bare, for the gluing of the meeting edge $b$ of the box sides. The other rectangular frame forms, in corresponding manner, the sides of the lower portion of the box, the bottom being veneered and glued to the sides in the same manner as the top. Figs. 5, and 8, show the finished structure.

Our method of forming and embossing the molding for the boxes may be somewhat modified to enable it to be carried out at a single operation by a simple automatic machine.

As the machine, however, does not form a part of the subject matter of the claims of this present application, but is embodied in the divisional application, Serial No. 477,497, filed by us June 13, 1893, we do not herein set it forth or illustrate it. The sheet celluloid and glued wooden strip are placed together and forced through a guide chute which turns up the sides or edges of the celluloid over the edges of the strip or backing, preparatory to the heating and embossing which may be effected in this case by heated rolls. The projecting edges of the celluloid are turned down upon the rear face of the backing by a second guide chute instead of by hand, and the molding is then run between a second pair of heated rollers subjecting it to a final heat and pressure, which secures the edges upon the back. This, it will be seen, is a mere variation of my method, enabling it to be done more directly and certainly, by means of the machine which carries it out. The details and advantages of this variation will be better understood from the fuller description given in connection with the machine for carrying it out, and it is therefore, unnecessary to go more into detail in this present application.

We have now described our method, our product, and one form of a simple hand apparatus for carrying out our method and making our product, as illustrating one embodiment of our invention.

We have purposely omitted many modifications which are suggested by mere mechanical skill, because to set them forth would obscure rather than to make clear the essential features of our invention.

We therefore claim, desiring to secure by Letters Patent all variations that may be made by mere skill in the art, the following:

1. A box cover, box, or like article, consisting of sides, each faced with celluloid veneer upon its exposed face and one edge, and a top, bottom, or other conjoined part, glued or cemented to the bare edges of the said sides and faced with celluloid veneer extending to and meeting the veneer upon the sides of the said box, but leaving the bare surface of such part in contact with the bare surface of the said side, substantially as, and for the purposes, set forth.

2. A slide for a box or similar article, consisting of a backing B faced with celluloid upon one side and each edge $c$ thereof, and divided to form bare edges $b$ for securing adjacent parts, and to permit the faced edges $c$ to be brought together to form the opposing and meeting edges of the side, substantially as, and for the purposes, set forth.

3. The method of manufacturing sides for celluloid boxes and similar articles, which consists in securing a celluloid facing to the face and edges of the backing by heat and pressure, turning down the projecting edges of the celluloid upon the rear face of the said backing, and then subjecting the whole to heat and pressure in a suitable press, substantially as, and for the purposes, set forth.

4. The method of manufacturing celluloid covered articles which consists in cementing a celluloid facing, conforming and securing it to the backing by heat and pressure, turning down the edges upon the rear face of the backing, and then applying heat and pressure, substantially as and for the purposes set forth.

5. The method of manufacturing sides for celluloid boxes and similar articles, which consists in securing and embossing a celluloid facing upon the face and edges of the backing by suitable cement and by heat and pressure, turning down the projecting edges of the celluloid upon the rear face of the said backing and forcing them firmly into contact with the backing by suitable pressure, substantially as, and for the purposes, set forth.

6. The method of constructing the sides of boxes or similar articles of celluloid, which consists in covering the face and edges of a strip or molding with suitable celluloid veneer, cutting and joining the said molding into a frame corresponding in shape to the form of the finished sides of the said article, and then severing the said frame as described, whereby the celluloid-covered edges may be brought together to form the opposing and meeting edges of the said article, substantially as, and for the purposes, set forth.

In testimony whereof we have hereunto set our hands this 7th day of November, 1892.

A. C. HAFELY.
JENS REDLEFSEN.

Witnesses:
MILTON D. F. HOWE,
F. W. GREAVES.